United States Patent
Kim et al.

(10) Patent No.: US 9,612,719 B2
(45) Date of Patent: Apr. 4, 2017

(54) INDEPENDENTLY OPERATED, EXTERNAL DISPLAY APPARATUS AND CONTROL METHOD THEREOF

(71) Applicant: Samsung Electronics Co., Ltd., Suwon-si, Gyeonggi-do (KR)

(72) Inventors: Jae-won Kim, Suwon-si (KR); Dong-yun Shin, Seongnam-si (KR); Jong-in Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 14/142,331

(22) Filed: Dec. 27, 2013

(65) Prior Publication Data

US 2014/0189589 A1    Jul. 3, 2014

(30) Foreign Application Priority Data

Jan. 3, 2013    (KR) .................. 10-2013-0000807

(51) Int. Cl.
*G06F 3/00*    (2006.01)
*G06F 3/0482*  (2013.01)
(Continued)

(52) U.S. Cl.
CPC ............ *G06F 3/0482* (2013.01); *G06F 3/147* (2013.01); *G06F 3/1462* (2013.01); *G09G 5/40* (2013.01);
(Continued)

(58) Field of Classification Search
None
See application file for complete search history.

(56) References Cited

U.S. PATENT DOCUMENTS

2004/0148586 A1* 7/2004 Gilboa ................ G06F 8/38
                                                      717/108
2005/0210394 A1* 9/2005 Crandall ............ H04L 12/1831
                                                      715/752
(Continued)

FOREIGN PATENT DOCUMENTS

EP    2 682 859 A2    1/2014
JP    2010-244575 A   10/2010
(Continued)

OTHER PUBLICATIONS

Daniel Thommes et al: RemoteUI: A high-performance remote user interface system for mobile consumer electronic devices. Consumer Electronics (ICCE). 2012 IEEE International Conference on, IEEE Jan. 13, 2012 (Jan. 13, 2012). pp. 670-671. XP032125045. DOI: 10.1109/ICCE.2012.6162021 ISBN: 978-1-4577-0230-3.

*Primary Examiner* — Toan Vu
(74) *Attorney, Agent, or Firm* — Jefferson IP Law, LLP

(57) ABSTRACT

A display apparatus is provided. The display apparatus includes a display section, a communicating section configured to communicate with an external display apparatus, a storage section configured to store a plurality of objects, and a controller configured to display a user interface for selection and combination of the plurality of objects stored in the storage section according to a command of a user to generate a scene of content, and to transmit information relating to the scene to the external display apparatus through the communicating section so that the same image as the scene is displayed in the external display apparatus in real time while the scene is being generated through the user interface.

19 Claims, 12 Drawing Sheets

(51) Int. Cl.
  *G06F 3/14*     (2006.01)
  *G06F 3/147*    (2006.01)
  *G06F 3/01*     (2006.01)
  *G09G 5/40*     (2006.01)

(52) U.S. Cl.
  CPC ..... *G09G 2340/10* (2013.01); *G09G 2354/00* (2013.01); *G09G 2360/04* (2013.01); *G09G 2370/022* (2013.01); *G09G 2370/06* (2013.01)

(56) References Cited

U.S. PATENT DOCUMENTS

| | | | | |
|---|---|---|---|---|
| 2007/0118801 A1* | 5/2007 | Harshbarger | ........ | G11B 27/031 715/730 |
| 2010/0045568 A1 | 2/2010 | Schwartz et al. | | |
| 2010/0067866 A1* | 3/2010 | Park | ........ | H04N 1/3871 386/278 |
| 2010/0092930 A1* | 4/2010 | Fletcher | ........ | G09B 5/062 434/178 |
| 2010/0138780 A1* | 6/2010 | Marano | ........ | G06F 3/1415 715/804 |
| 2011/0165841 A1* | 7/2011 | Baek | ........ | H04L 67/10 455/41.2 |
| 2011/0210983 A1 | 9/2011 | Theimer et al. | | |
| 2011/0281538 A1* | 11/2011 | Morrison | ........ | H04H 60/46 455/185.1 |
| 2012/0014674 A1 | 1/2012 | Knight et al. | | |
| 2012/0038541 A1* | 2/2012 | Song | ........ | G06F 3/1423 345/1.1 |
| 2012/0177339 A1* | 7/2012 | Chang | ........ | G06F 3/04855 386/230 |
| 2012/0178368 A1* | 7/2012 | Fleck | ........ | H04W 52/0274 455/41.2 |
| 2012/0233553 A1* | 9/2012 | Barrus | ........ | G06Q 10/10 715/751 |
| 2012/0280948 A1* | 11/2012 | Barrus | ........ | G06F 3/04883 345/179 |
| 2013/0027404 A1* | 1/2013 | Sarnoff | ........ | G06T 1/20 345/441 |
| 2013/0083906 A1* | 4/2013 | Roberts | ........ | H04N 7/147 379/88.13 |
| 2013/0138608 A1* | 5/2013 | Smith | ........ | G06F 17/30575 707/610 |
| 2013/0176415 A1* | 7/2013 | Kim | ........ | H04N 5/23219 348/78 |
| 2013/0203492 A1* | 8/2013 | Yum | ........ | A63F 13/06 463/31 |
| 2013/0239049 A1* | 9/2013 | Perrodin | ........ | G06F 3/0481 715/800 |
| 2013/0239063 A1* | 9/2013 | Ubillos | ........ | H04L 51/24 715/838 |
| 2013/0254158 A1* | 9/2013 | Morelli | ........ | G06F 17/30598 707/608 |
| 2014/0031120 A1* | 1/2014 | Mallinson | ........ | A63F 13/02 463/31 |
| 2014/0053078 A1* | 2/2014 | Kannan | ........ | H04W 4/023 715/748 |
| 2014/0118222 A1* | 5/2014 | Barrett | ........ | G01C 21/3688 345/2.2 |

FOREIGN PATENT DOCUMENTS

| | | |
|---|---|---|
| KR | 10-2007-0022891 A | 2/2007 |
| KR | 10-2008-0005053 A | 1/2008 |
| KR | 10-2012-0020460 A | 3/2012 |

* cited by examiner

FIG. 5
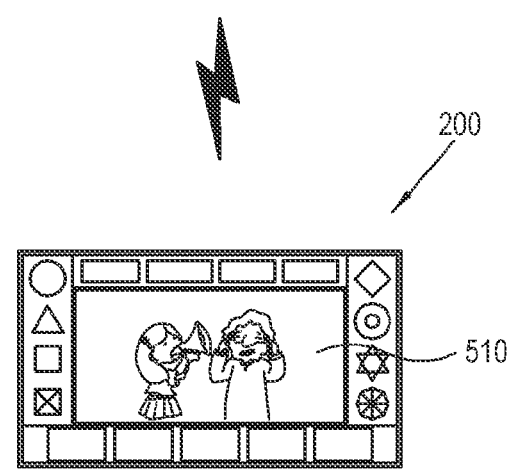

INDEPENDENTLY OPERATED, EXTERNAL DISPLAY APPARATUS AND CONTROL METHOD THEREOF

CROSS-REFERENCE TO RELATED APPLICATION(S)

This application claims the benefit under 35 U.S.C. §119(a) of a Korean patent application filed on Jan. 3, 2013 in the Korean Intellectual Property Office and assigned Serial No. 10-2013-0000807, the entire disclosure of which is hereby incorporated by reference.

TECHNICAL FIELD

The present disclosure relates to a display apparatus which processes various types of content data to display a content image, and a control method thereof. More particularly, the present disclosure relates to a display apparatus with a structure which provides an environment in which a user may easily generate desired content using various types of objects such as an image, and a control method thereof.

BACKGROUND

A display apparatus is provided with a display panel for image display, and processes content data stored therein or received from the outside to display a content image. The display apparatus is realized in various types to provide an image, which may include, for example, a television, a computer monitor, a portable multimedia player, a tablet computer, a mobile phone, or the like. Such a display apparatus may be independently operated, or may be operated in association with a different apparatus through wired or wireless communication.

The display apparatus executes a variety of content data such as moving images, games, web pages, e-books, and/or the like provided from a content provider. A user of the display apparatus may not only be provided with content from the content provider, but may also generate content to provide the generated content to a different user. To this end, the display apparatus may provide an environment in which the user may generate content, by executing an application program relating to content generation.

However, the content generation environment provided by the display apparatus may cause inconvenience to a user according to the types of the display apparatus. For example, if the display apparatus is realized as a television, an input interface of the television may cause an inconvenience in content generation of the user. Further, if the display apparatus is realized as a mobile device, a small display screen of the mobile device may cause an inconvenience in content confirmation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

In accordance with an aspect of the present disclosure, a display apparatus is provided. The display apparatus includes a display section, a communicating section configured to communicate with an external display apparatus, a storage section configured to store a plurality of objects, and a controller configured to display a user interface for selection and combination of the plurality of objects stored in the storage section according to a command of a user to generate a scene of content, and to transmit information relating to the scene to the external display apparatus through the communicating section so that the same image as the scene is displayed in the external display apparatus in real time while the scene is being generated through the user interface.

In accordance with an aspect of the present disclosure, the external display apparatus that may store the same data as the plurality of objects stored in the storage section. The external display apparatus may include a controller that may perform a control, by transmitting identification information about each object included in the scene and information about a position of the object in the scene to the external display apparatus, so that the external display apparatus selects the object corresponding to the identification information from the plurality of stored objects.

In accordance with an aspect of the present disclosure, if the object included in the scene is not stored in the storage section, the controller may transmit the object to the external display apparatus so that the external display apparatus adds the object to the image.

In accordance with an aspect of the present disclosure, the size of the image displayed in the external display apparatus may be larger than the size of the scene displayed in the display section.

In accordance with an aspect of the present disclosure, the display apparatus may include a mobile device.

In accordance with another aspect of the present disclosure, the user interface include a first menu in which the plurality of objects stored in the storage section are displayed to be selectable, a second menu which provides an option for addition of an object which is not stored in the storage section, and a scene formation area in which the scene formed by the object selected or newly added through the first menu or the second menu is displayed, and wherein the image displayed in the external display apparatus may be the same as the scene in the scene formation area.

In accordance with another aspect of the present disclosure, the object which is selectable through the first menu may include a background object which is a background image of the scene, and an inserted image object which is an image overlaid on the background object.

In accordance with another aspect of the present disclosure, the option provided by the second menu may include at least one of an option for adding sound information, a text or an image input or newly added by the user to the scene, an option for combining the plurality of scenes in a temporal order to generate the content, and an option for providing an image to be added to the scene for drawing of the user.

In accordance with another aspect of the present disclosure, controller may store the generated content in the storage section, or may transmit the content to the external display apparatus to be stored in the external display apparatus.

In accordance with another aspect of the present disclosure, the communicating section may be configured to communicate with an external device, and the controller may transmit the generated content to the external device to be stored in the external device.

In accordance with another aspect of the present disclosure, a control method of a display apparatus is provided. The control method includes communicating with an external display apparatus for communication, displaying, on the display apparatus, a user interface provided to generate a scene of content, selecting and combining a plurality of objects which is stored in the display apparatus in advance through the user interface according to a command of a user to generate the scene, and transmitting information relating to the scene to the external display apparatus so that the same image as the scene is displayed in the external display apparatus in real time while the scene is being generated.

In accordance with another aspect of the present disclosure, the external display apparatus may store the same data as the plurality of objects stored in the storage section, and wherein the transmission of the information relating to the scene to the external display apparatus may include performing a control, by transmitting identification information about each object included in the scene and information about a position of the object in the scene to the external display apparatus, so that the external display apparatus selects the object corresponding to the identification information from the plurality of stored objects.

In accordance with another aspect of the present disclosure, the transmission of the information relating to the scene to the external display apparatus may include, if the object included in the scene is not stored in the storage section, transmitting the object to the external display apparatus so that the external display apparatus adds the object to the image.

In accordance with another aspect of the present disclosure, the size of the image displayed in the external display apparatus may be larger than the size of the scene displayed in the display section.

In accordance with another aspect of the present disclosure, the display apparatus may include a mobile device.

In accordance with another aspect of the present disclosure, the user interface includes a first menu in which the plurality of objects stored in the storage section are displayed to be selectable, a second menu which provides an option for addition of an object which is not stored in the storage section, and a scene formation area in which the scene formed by the object selected or newly added through the first menu or the second menu is displayed, and wherein the image displayed in the external display apparatus may be the same as the scene in the scene formation area.

In accordance with another aspect of the present disclosure, the object which is selectable through the first menu includes a background object which is a background image of the scene, and an inserted image object which is an image overlaid on the background object.

In accordance with another aspect of the present disclosure, the option provided by the second menu may include at least one of an option for adding sound information, a text or an image input or newly added by the user to the scene, an option for combining the plurality of scenes in a temporal order to generate the content, and an option for providing an image to be added to the scene for drawing of the user.

In accordance with another aspect of the present disclosure, the method may further include storing the generated content in the storage section, or transmitting the content to the external display apparatus to be stored in the external display apparatus.

In accordance with another aspect of the present disclosure, the method may further include accessing an external device for communication, and transmitting the generated content to the external device to be stored in the external device.

In accordance with another aspect of the present disclosure, a system is provided. The system includes at least one display apparatus, and an external display apparatus configured to communicate with the at least one display apparatus, wherein each of the at least one display apparatus includes a display section, a storage section configured to store a plurality of objects, and a controller configured to display a user interface for selection and combination of the plurality of objects stored in the storage section according to a command of a user to generate a scene of content, and to transmit information relating to the scene to the external display apparatus so that the same image as the scene is displayed in the external display apparatus in real time while the scene is being generated through the user interface.

In accordance with another aspect of the present disclosure, the at least one display apparatus may transmit information relating to the scene to each other in real time to generate the scene in cooperation, and wherein the external display apparatus may display the same image as the scene generated by the at least one display apparatus in real time.

In accordance with another aspect of the present disclosure, each of the at least one display apparatus may generate each of the plurality of scenes which forms the content, and wherein the external display apparatus may displays the same image as the scene generated by any one of the at least one display apparatus, or may display together the same images as the plurality of scenes respectively generated by the at least one display apparatus.

In accordance with another aspect of the present disclosure, a method for creating content is provided. The method includes communicating, by a display apparatus, with an external display apparatus, displaying, by the display apparatus, a user interface with which a user generates content, selecting and combining a plurality of objects which is stored in the display apparatus in advance through the user interface according to a command of a user to generate the content, and transmitting information relating to the scene to the external display apparatus in real time with the selection and combining of the plurality of objects.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an example of an image displayed in a first display apparatus while a content scene is being generated in a second display apparatus according to an embodiment of the present disclosure.

The same reference numerals are used to represent the same elements throughout the drawings.

DETAILED DESCRIPTION

Figure 1:
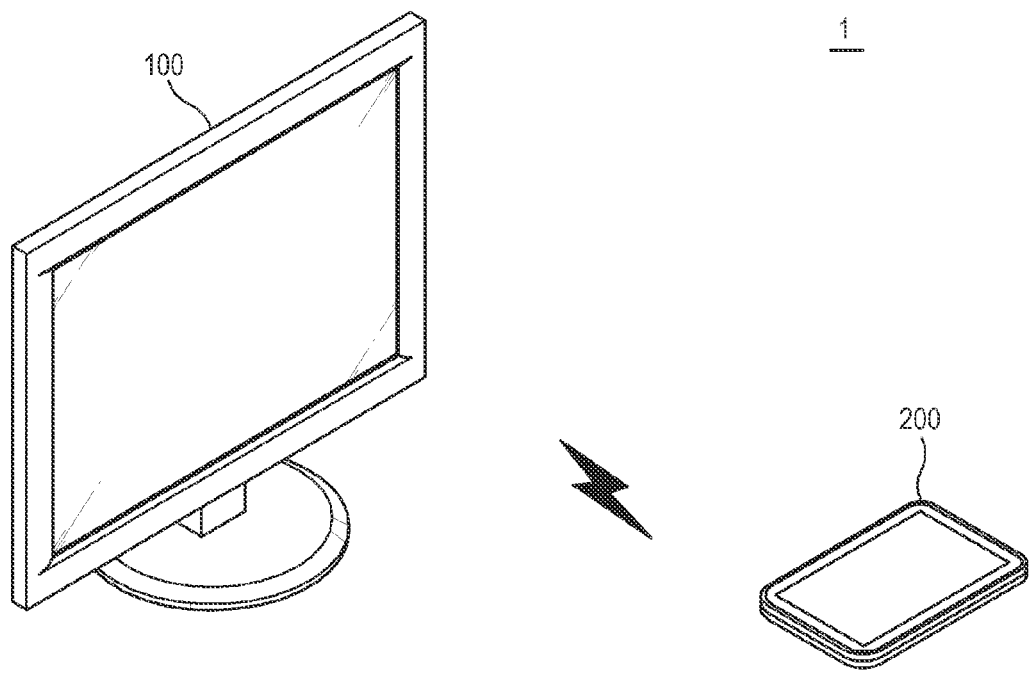
FIG. 1 illustrates an example of a system according to a first embodiment of the present disclosure.

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a display apparatus may be included, integrated, or otherwise connected to an electronic device.

FIG. 1 illustrates a system 1 according to a first embodiment of the present disclosure.

Referring to FIG. 1, according to various embodiments of the present disclosure, the system 1 includes a first display apparatus 100 and a second display apparatus 200 which respectively process an image signal by a predetermined image processing process to display an image. According to various embodiments of the present disclosure, the first display apparatus 100 and the second display apparatus 200 perform bi-directional communication to exchange a variety of data or information.

The first display apparatus 100 and the second display apparatus 200 may be respectively realized as any device which can display an image. For example, the first display apparatus 100 and the second display apparatus 200 may be respectively realized as a television, a monitor, a portable multimedia player, a tablet computer, a mobile phone, or the like. According to the embodiment of the present disclosure illustrated in FIG. 1, an example is illustrated in which the first display apparatus 100 is a television and the second display apparatus 200 is a mobile device.

The first display apparatus 100 as the television has a display screen larger than that of the second display apparatus 200 as the mobile device. The second display apparatus 200 as the mobile device may be held by a user for easy movement.

Hereinafter, a specific configuration of the first display apparatus 100 and the second display apparatus 200 will be described referring to FIG. 2.

Figure 2:
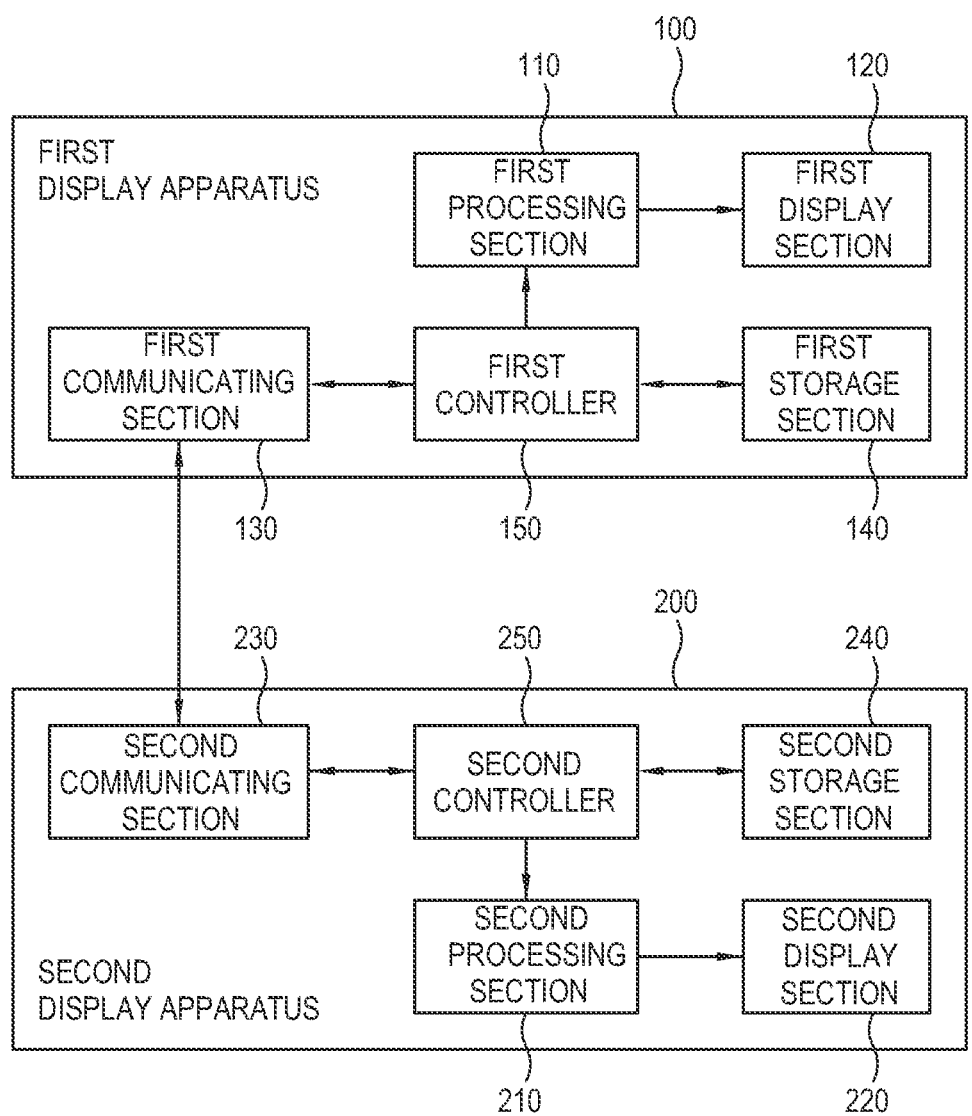
FIG. 2 is a block diagram illustrating a configuration of a first display apparatus and a second display apparatus of a system such as, for example, the system illustrated in FIG. 1 according to an embodiment of the present disclosure.

FIG. 2 is a block diagram illustrating a configuration of a first display apparatus and a second display apparatus of a system such as, for example, the system illustrated in FIG. 1 according to an embodiment of the present disclosure.

Referring to FIG. 2, the first display apparatus 100 includes a first processing section 110 which processes data, a first display section 120 which displays the data processed by the first processing section 110 as an image, a first communicating section 130 which communicates with the second display apparatus 200, a first storage section 140 which stores data, and a first controller 150 which controls an entire operation of the first display apparatus 100.

The first processing section 110 processes data received through the first communicating section 130 or stored in the first storage section 140 by a predetermined process. The first processing section 110 may be realized as a processing board (not shown) in which a System-On-Chip (SOC) with integrated functions for various processes or individual chipsets for various processes are mounted on a printed circuit board, and may be built in the first display apparatus 100.

The first processing section 110 is operated as follows. For example, the first processing section 110 may process an application program stored in the first storage section 140 for execution, and may output an image signal relating to the application program to the first display section 120 so that an image of the application program is displayed by the first display apparatus 100 (e.g., in the first display section 120). Further, the first processing section 110 may process data stored in the first storage section 140 on the basis of predetermined information received through the first communicating section 130 to display an image which reflects the predetermined information.

The first display section 120 displays an image on the basis of an image signal or image data output from the first processing section 110. The first display section 120 is not limited to a particular type, and may be realized as various types of displays which use liquid crystal, plasma, light-emitting diodes, organic light-emitting diodes, a surface-conduction electron-emitter, carbon nano-tubes, nano-crystal or the like.

The first display section 120 may include an additional configuration according to the type of a panel thereof. For example, if the first display section 120 includes a liquid crystal panel, the first display section 120 includes a backlight unit (not shown) which supplies light to the liquid crystal panel and a panel drive board (not shown) which drives the panel.

According to various embodiments of the present disclosure, the first communicating section 130 is connected to a network. For example, the first communicating section 130 may be connected to a local or wide area network to perform bi-directional communication with various external devices (not shown) such as a server (not shown), and/or the like. According to the various embodiments of the present disclosure illustrated in FIGS. 1 and 2, the first communicating section 130 is connected to the second display apparatus 200 for communication. The first communicating section 130 may perform communication according to various wired or wireless communication protocols. For example, the first communicating section 130 may be connected to the second display apparatus 200 through an Access Point (AP) according to a wireless communication protocol such as Wi-Fi, or the like, or may be connected to the second display apparatus 200 in a peer-to-peer manner.

The first storage section 140 stores a variety of data under the control of the first controller 150. The first storage section 140 is realized as a non-volatile memory such as a flash memory or a hard disk drive. The first storage section 140 is accessed by the first controller 150, the first processing section 110, and/or the like, so that reading, recording, revision, deletion, updating, and/or the like of data may be performed.

The first controller 150 includes a CPU. The first controller 150 may include the CPU mounted on a processing board (not shown) that forms the first processing section 110. The first controller 150 controls operations of the respective components in the first display apparatus 100, including the first processing section 110. The first controller 150 determines a processing operation of the first processing section 110 corresponding to data, information, a command, an event generated by a user or received through the first communicating section 130, and/or the like. The first controller 150 outputs a control signal or command to the first processing section 130 to execute the determined operation.

The second display apparatus 200 includes a second processing section 210, a second display section 220, a second communicating section 230, a second storage section 240, and a second controller 250. The respective components of the second display apparatus 200 are similar to those of the first display apparatus 100, and detailed description thereof will be omitted.

Because the respective components of the first display apparatus 100 and the second display apparatus 200 are similar to each other in basic operations and/or functions thereof, the first display apparatus 100 and the second display apparatus 200 may include an additional configuration for a different operation and/or function For example, the second display apparatus 200 may further include a microphone (not shown) for input of a user's voice, or may be realized as a touch-screen to facilitate an input operation of a user.

With such a structure, the first display apparatus 100 and the second display apparatus 200 may receive content provided by a content provider. According to various embodiments of the present disclosure, the first display apparatus 100 and the second display apparatus 200 may receive content provided by a content provider through a network. The first display apparatus 100 and the second display apparatus 200 may execute and display the content. The content which is executable by the first display apparatus 100 and the second display apparatus 200 may include content which may be generated by a user. As an example, the content which is executable by the first display apparatus 100 and the second display apparatus 200 may include content which by a general user without expertise, such as, for example, storytelling content, and/or the like.

The storytelling content refers to content about a story which is generated by a content provider using various image objects and non-image objects and is provided to a different user who wants to view the content. The non-image objects collectively refer to objects which are not an image, such as a text, a sound, and/or the like.

According to various embodiments of the present disclosure, the objects from which a story is generated may form a scene. The storytelling content may include a single scene, or may include a plurality of scenes which is sequentially arranged.

Figure 3:
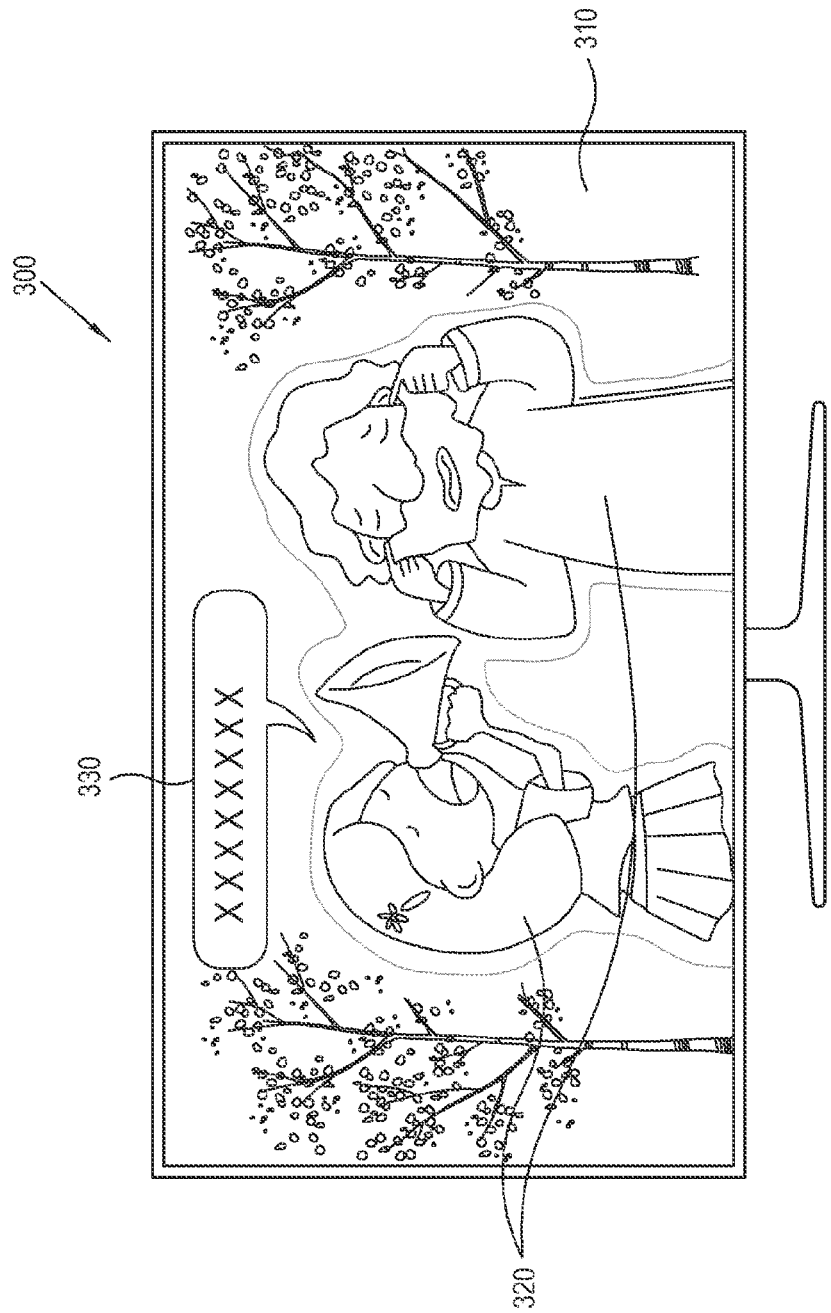
FIG. 3 illustrates an example of a scene of storytelling content displayed in a first display apparatus or a second display apparatus according to an embodiment of the present disclosure.

FIG. 3 illustrates an example of a scene of storytelling content displayed in a first display apparatus or a second display apparatus according to an embodiment of the present disclosure.

Referring to FIG. 3, a scene 300 of the storytelling content includes a background object 310 as an image which forms the background of the scene 300, an inserted image object 320 as an image which may be overlaid on the background object 310. The scene 300 may also include an additional object 330 which may be added to the background object 310 and/or the inserted image object 320. For example, the additional object 330 may be added in order to explain the content and/or context of the scene 300.

According to various embodiments of the present disclosure, the background object 310 may employ various images such as a landscape (e.g., a city, a country, a mountain, a river, a field, a sky, a sea, a space, and/or the like) as the background of the scene 300. When a user views the scene 300, the background object 310 is disposed in back of the inserted image object 320 so that the inserted image object 320 is disposed on the front side.

The inserted image object 320 collectively refers to images which are overlaid on the background object 310, such as a human, animal, thing, and/or the like. For example, if the scene 300 is a scene in which a person stands on a field, the field may correspond to the background object 310, and the person may correspond to the inserted image object 320. Further, if the scene 300 is a scene in which an airplane is flying in the sky, the sky may correspond to the background object 310, and the airplane may correspond to the inserted image object 320.

However, in the scene 300 which is formed by only the background object 310 and the inserted image object 320, because there is no explanation, what intent or meaning the scene 300 has may be ambiguous (e.g., to a user viewing the screen). The additional object 330 has the function of directly showing the intent or meaning of the scene 300 (e.g., the additional object 330 may provide context for the scene). For example, the additional object 330 may supplement the scene 330 with a story thereof to a viewer of the scene 300. The division (e.g., and arrangement) of the inserted image object 320 and the additional object 330 may vary according to design as a matter of convenience.

For example, the additional object 330 may be a non-image object such as a text, sound, and/or the like. As another example, the additional object 330 may be an image. According to various embodiments of the present disclosure, the additional object 330 may be a combination of non-image objects and image objects. If the inserted image object 320 is a human or a personified being, the additional object 330 may be a text in a speech balloon or audio data for expression of a speech of the inserted image object 320.

According to various embodiments of the present disclosure, the respective objects (e.g., background object 310, inserted image object 320, additional object, and/or the like) may be used (e.g., configured, arranged, and/or the like) to convey a story of the scene 300. For example, a user may understand the story of the scene 300 through the respective objects (e.g., background object 310, inserted image object 320 and additional object 330) which form the scene 300.

If the storytelling content includes the plurality of scenes 300 and the respective scenes 300 are sequentially executed and displayed in a temporal order, the user may understand a long and complicated story like a movie or drama from the content.

This storytelling content may not be generated only by a special content provider with special equipment or skill, but may also be generated by a general user as the first display apparatus 100 or the second display apparatus 200 provides a User Interface (UI) environment to execute an application program for content generation.

Hereinafter, the UI environment with which the user may generate the storytelling content through the second display apparatus 200 as the mobile device will be described.

Figure 4:
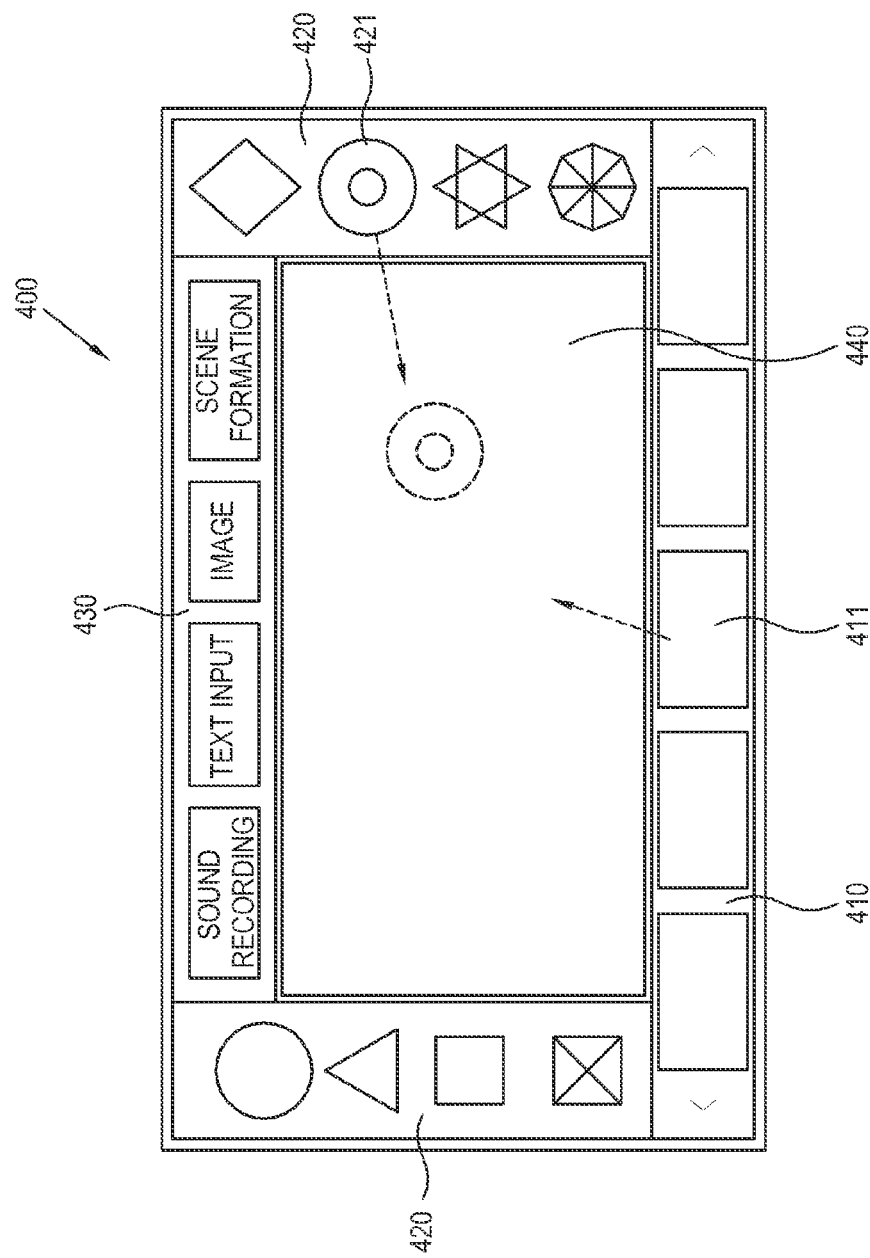
FIG. 4 illustrates an example of a User Interface (UI) displayed in a second display apparatus to allow a user to generate storytelling content according to an embodiment of the present disclosure.

FIG. 4 illustrates an example of a UI displayed in a second display apparatus to allow a user to generate storytelling content according to an embodiment of the present disclosure.

According to various embodiments of the present disclosure, the second storage section 240 of the second display apparatus 200 stores an application program and data for generation of the storytelling content. If the second controller 250 executes the application program, a content generation UI 400 is displayed in the second display section 220, as illustrated in FIG. 4.

Referring to FIG. 4, the UI 400 includes a background image menu 410, an inserted image menu 420, an additional option menu 430, a scene formation area 440, and the like. The background image menu 410 may display a plurality of background objects 411 that are stored in advance and that are provided by the application program. The inserted image menu 420 may display a plurality of inserted image objects 421 that are stored in advance and that are provided by the application program. The additional option menu 430 may provide options for formation of an additional object. The scene formation area 440 corresponds to an area in which a scene of storytelling content is formed by various objects selected from the respective menus (e.g., the background image menu 410, the inserted image menu 420, and additional option menu 430).

The arrangement of the respective menus (e.g., the background image menu 410, the inserted image menu 420, and additional option menu 430) and the scene formation area 440 is an example, and thus, may be variously changed according to design and/or preferences (e.g., user preferences and/or the like).

The background objects 411 and the inserted image objects 421 respectively displayed in the background image menu 410 and the inserted image menu 420 may be realized as thumb-nail images so that the user can easily confirm their original content.

A method of generating a scene of the storytelling content through the UI 400 by the user will be described as follows.

According to various embodiments of the present disclosure, the user selects and determines the background object 411 for formation of the background of the scene from the background image menu 410. If the second display section 220 is realized (e.g., configured) as a touch-screen, the user may drag the background object 411 selected from the background image menu 410 and may drop the selected background object 411 into the scene formation area 440, to thereby perform the object selection and determination. This method is an example, and thus, various methods may be used to select and determine the object.

According to the selection and determination of the background object 411, the second controller 250 displays an image of the corresponding background object 411 in the scene formation area 440.

The user selects and determines the inserted image object 421 from the inserted image menu 420. In a similar manner to the example of selecting a the background object 411, the user may drag the inserted image object 421 selected from the inserted image menu 420 and may drop the selected inserted image object 421 at a desired location in the scene formation area 440. Thereafter, the second controller 250 displays the corresponding inserted image object 421 to be overlaid on the background object 411, in the scene formation area 440. The second controller 250 may display the inserted image object 421 at the location at which the selected inserted image object 421 is dropped.

In this manner, the user may form a scene based on the background object 411 and the inserted image object 421 in the scene formation area 440.

Thereafter, the user may select and determine an option provided by the additional option menu 430 to add an additional object for explanation of a story of the formed scene to the scene.

According to various embodiments of the present disclosure, the options of the additional objects provided by the additional option menu 430 may be determined in various forms, which may include "sound recording", "text input", "image", "scene formation," and/or the like. The names of these options are given for convenience's sake, and thus, do not limit the scope of the present disclosure.

For example, if "sound recording" is selected, the user may input the user's voice or a variety of sound through the microphone (not shown) of the second display apparatus 200. The second controller 250 adds audio data on the input voice or sound to data on the scene currently formed in the scene formation area 440. The added audio data is executed, when the corresponding scene is executed and displayed later in the first display apparatus 100 or the second display apparatus 200, together with the scene.

If "text input" is selected, the second controller 250 provides a character input interface such as an image keyboard (not shown) so that the user can input a predetermined text at a specific position of the scene formed in the scene formation area 440. The second controller 250 adds the input text to the data on the corresponding scene.

If "image" is selected, the second controller 250 provides a separate application program or tool from which the user may generate a new image, or provides an interface through which the user may call an image stored in the second display apparatus 200 or various devices on the network. The second controller 250 inserts the image selected in this manner into the scene formed in the scene formation area 440.

If "scene formation" is selected, the second controller 250 provides an interface through which the user may combine the plurality of scenes generated as described above and currently stored in the second storage section 240 in a desired order. The second controller 250 generates storytelling content using the plurality of scenes combined in this manner.

According to the above-described method, the user may generate the storytelling content through the UI 400 provided by the second display apparatus 200. The second display apparatus 200 may store the generated storytelling content in the second storage section 240, may transmit the storytelling content to the first display apparatus 100 so that the first display apparatus 100 can store and execute the storytelling content, or may transmit the storytelling content to a content server (not shown) on the network.

However, the storytelling content generation environment of the second display apparatus 200 provided in this manner may cause the following inconvenience to the user.

If the second display apparatus 200 is a mobile device, the user may form a scene of storytelling content in the scene formation area 440 using the drag-and-drop method. However, because the size of the second display section 220 may be small in view of characteristics of the mobile device, the user may not easily view the scene displayed in the scene formation area 440.

In consideration of this problem, according to the present embodiment, the following method is proposed.

FIG. 5 illustrates an example of an image displayed in a first display apparatus while a content scene is being generated in a second display apparatus according to an embodiment of the present disclosure.

Referring to FIG. 5, the user generates one scene of the storytelling content through a UI displayed in the second display apparatus 200. This UI is approximately the same as in the embodiment illustrated in FIG. 4, and detailed description thereof will be omitted.

While one scene of the storytelling content is being generated through the UI displayed in the second display apparatus 200, the second controller 250 of the second display apparatus 200 performs a control so that the same image 520 as the scene displayed in a scene formation area 510 of the UI is displayed in the first display apparatus 100. For example, while the storytelling content is being generated in the second display apparatus 200, the first display apparatus 100 displays the same image 520 as the image 510 of the storytelling content generated in the second display apparatus 200 in real time.

If the first display apparatus 100 is a television, because the first display apparatus 100 has a display screen larger than that of the second display apparatus 200, the user may clearly confirm the image 510 of the scene of the storytelling content generated in the second display apparatus 200 as the large image 520 in the first display apparatus 100. According to various embodiments of the present disclosure, because the user generates the storytelling content in the second display apparatus 200, easily generating the storytelling content is possible compared with a case in which the storytelling content is generated in the first display apparatus 100.

In order to display the same image 520 as the scene formation area 510 in the first display apparatus 100 while the scene is being generated in the scene formation area 440 of the second display apparatus 200, the following configuration may applied between the first display apparatus 100 and the second display apparatus 200.

Figure 6:
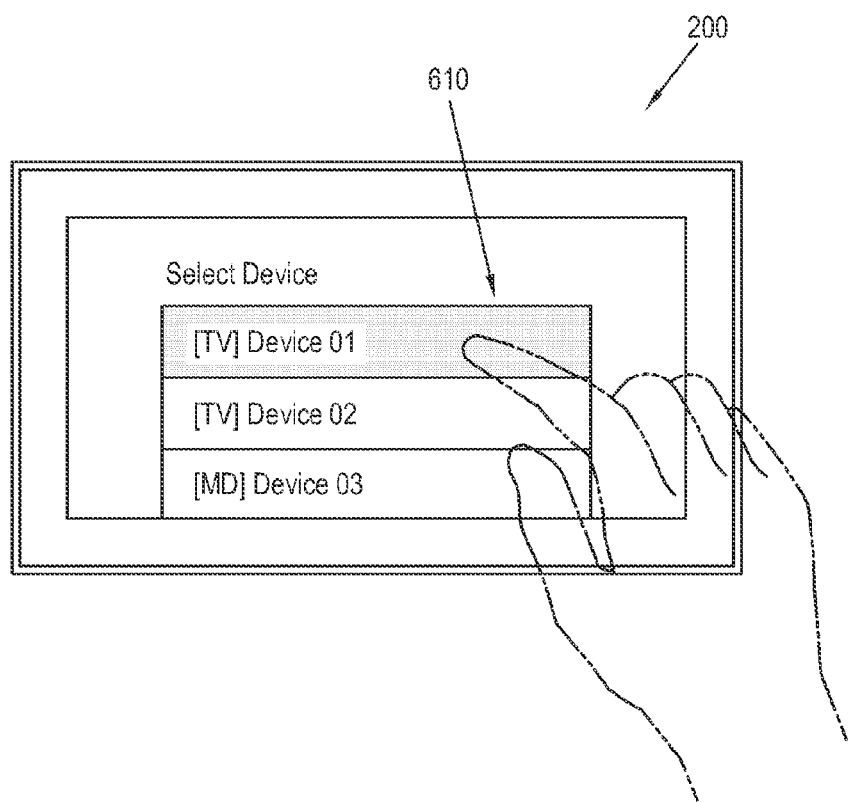
FIG. 6 illustrates an example of a UI which provides selection of devices which are accessible by a second display apparatus for communication according to an embodiment of the present disclosure.

FIG. 6 illustrates a UI which provides selection of devices which are accessible by a second display apparatus for communication according to an embodiment of the present disclosure.

Referring to FIG. 6, the second display apparatus 200 may display a UI 610 which indicates various devices which are currently accessible by the second display apparatus 200 for communication. The user may click a desired device from among the devices displayed in the UI 610 to designate a communication connection between the selected device and the second display apparatus 200. For example, the device selected in the UI 610 serves as the first display apparatus 100 in the above-described embodiment.

The communication connection between the first display apparatus 100 and the second display apparatus 200 may be performed by various techniques, which does not limit the scope of the present disclosure. For example, the first display apparatus 100 and the second display apparatus 200 may be connected to each other for communication on the basis of a network technique which supports a Universal Plug and Play (UPnP) function based on Transmission Control Protocol/Internet Protocol (TCP/IP), and/or the like.

Figure 7:
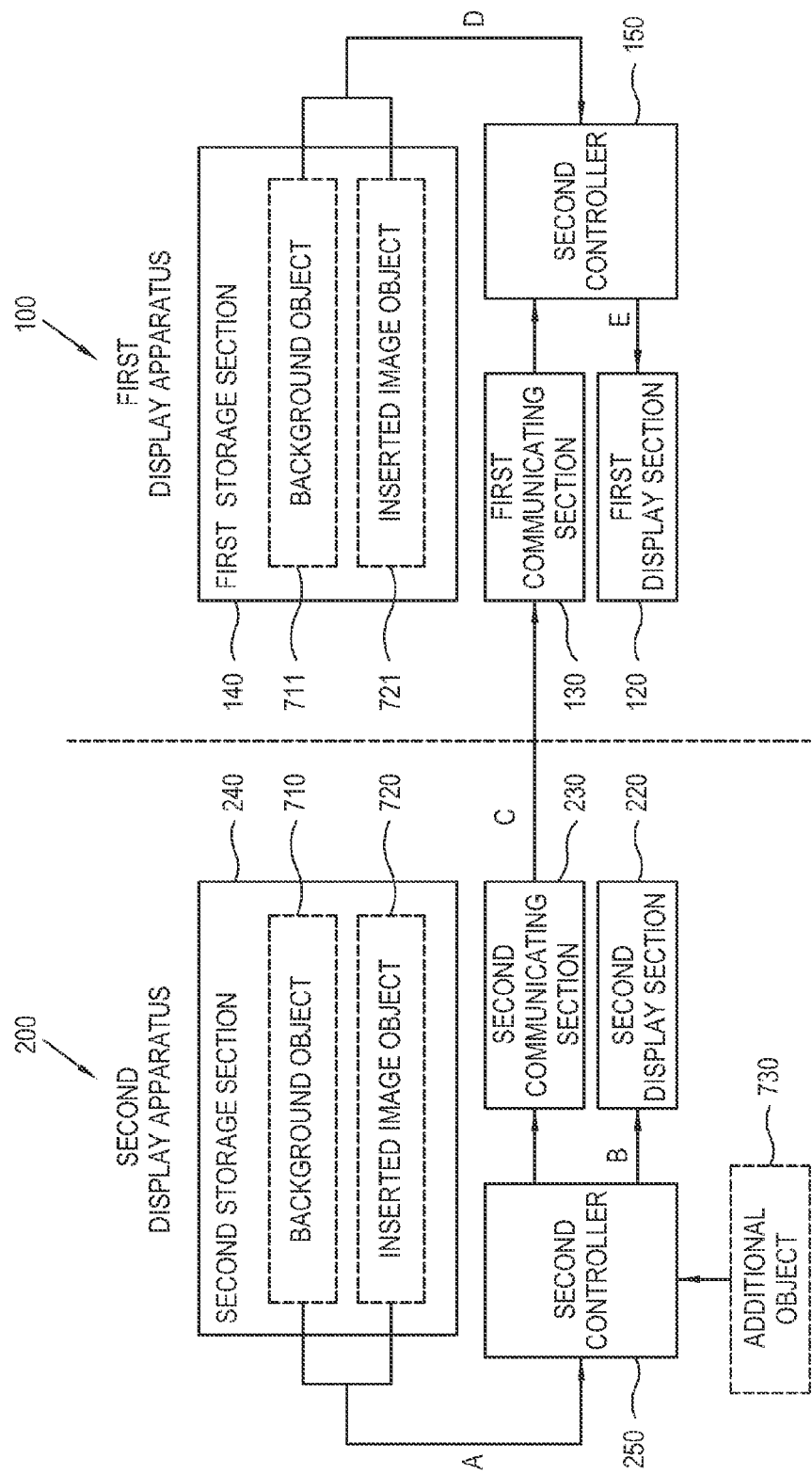
FIG. 7 is a block diagram illustrating a configuration of a data transmission relationship between a first display apparatus and a second display apparatus according to an embodiment of the present disclosure.

FIG. 7 is a block diagram illustrating a configuration of a data transmission relationship between a first display apparatus and a second display apparatus according to an embodiment of the present disclosure.

Referring to FIG. 7, the second storage section 240 of the second display apparatus 200 stores a background object 710 and an inserted image object 720 for generation of a scene of storytelling content. The second controller 250 may provide the background object 710 and the inserted image object 720 stored in the second storage section 240 in generation of the storytelling content, and the user may select the background object 710 and the inserted image object 720 to form a scene, similarly to the above-described various embodiments of the present disclosure.

The first storage section 140 of the first display apparatus 100 may also store a background object 711 and an inserted image object 721. The background object 711 and the inserted image object 721 stored in the first storage section 140 have the same data as in the background object 710 and the inserted image object 720 stored in the second storage section 240.

According to various embodiments of the present disclosure, such a configuration may be achieved by installing an application program for generation of the storytelling content in the second display apparatus 200 and by installing an application program corresponding to the application program of the second display apparatus 200 in the first display apparatus 100. As the application programs for generation of the storytelling content are respectively installed in the first display apparatus 100 and the second display apparatus 200, a communication channel for transmission of data or information relating to content generation may be built.

According to various embodiments of the present disclosure, if the user selects a predetermined background object 710 and a predetermined inserted image object 720 to form a scene of the storytelling content, then, at operation A, the second controller 250 calls the selected background object 710 and inserted image object 720 from the second storage section 240.

Thereafter, at operation B, the second controller 250 performs a control so that the called background object 710 and inserted image object 720 are displayed in the above-described scene formation area of the second display apparatus 200. For example, the second controller 250 transmits the data to the second display section 220 such that the called background object 710 and inserted image object 720 are displayed in the above-described scene formation area of the second display apparatus 200.

Thereafter, at operation C, the second controller 250 transmits identification information about the called background object 710 and inserted image object 720 and position information thereof in the scene, which are not data on the called background object 710 and inserted image object 720, to the first display apparatus 100 through the second communicating section 230. The first display apparatus 100 may receive the identification information about the called background object 710 and inserted image object 720 and position information thereof in the scene through the first communicating section 130.

If the identification information about the objects and the position information in the scene are received through the first communicating section 130, then, at operation D, the first controller 150 calls the background object 711 and the inserted image object 721 corresponding to the identification information from the first storage section 140. As described above, the background object 711 and the inserted image object 721 have the same data as in the background object 710 and the inserted image object 720.

At operation E, the first controller 150 performs a control so that an image formed by the called background object 711 and inserted image object 721 is displayed in the first display apparatus 100. The first controller 150 arranges the inserted image object 721 in the image according to the position information in the scene. For example, the first controller 150 may control the first display section 120 to display the image formed by the called background object 711 and inserted image object 721.

According to various embodiments of the present disclosure, the second controller 250 may receive an additional object 730 in the scene formation. Because the additional object 730 is not stored in the first storage section 140, the second controller 250 may transmit the additional object 730 together with the identification information and the position information in step C. According to various embodiments of the present disclosure, the second controller 250 may transmit information about the additional object 730 with which the first controller 150 may determine a location at which to retrieve the additional object 730. For example, the second controller 250 may transmit a location of a server (e.g., a web server) storing the additional object 730. The first controller 150 adds the additional object 730 received through the first communicating section 130 to the image displayed in the first display apparatus 100.

In this manner, the same image as the scene of the storytelling content being generated in the second display apparatus 200 may be displayed in the first display apparatus 100.

Figure 8:
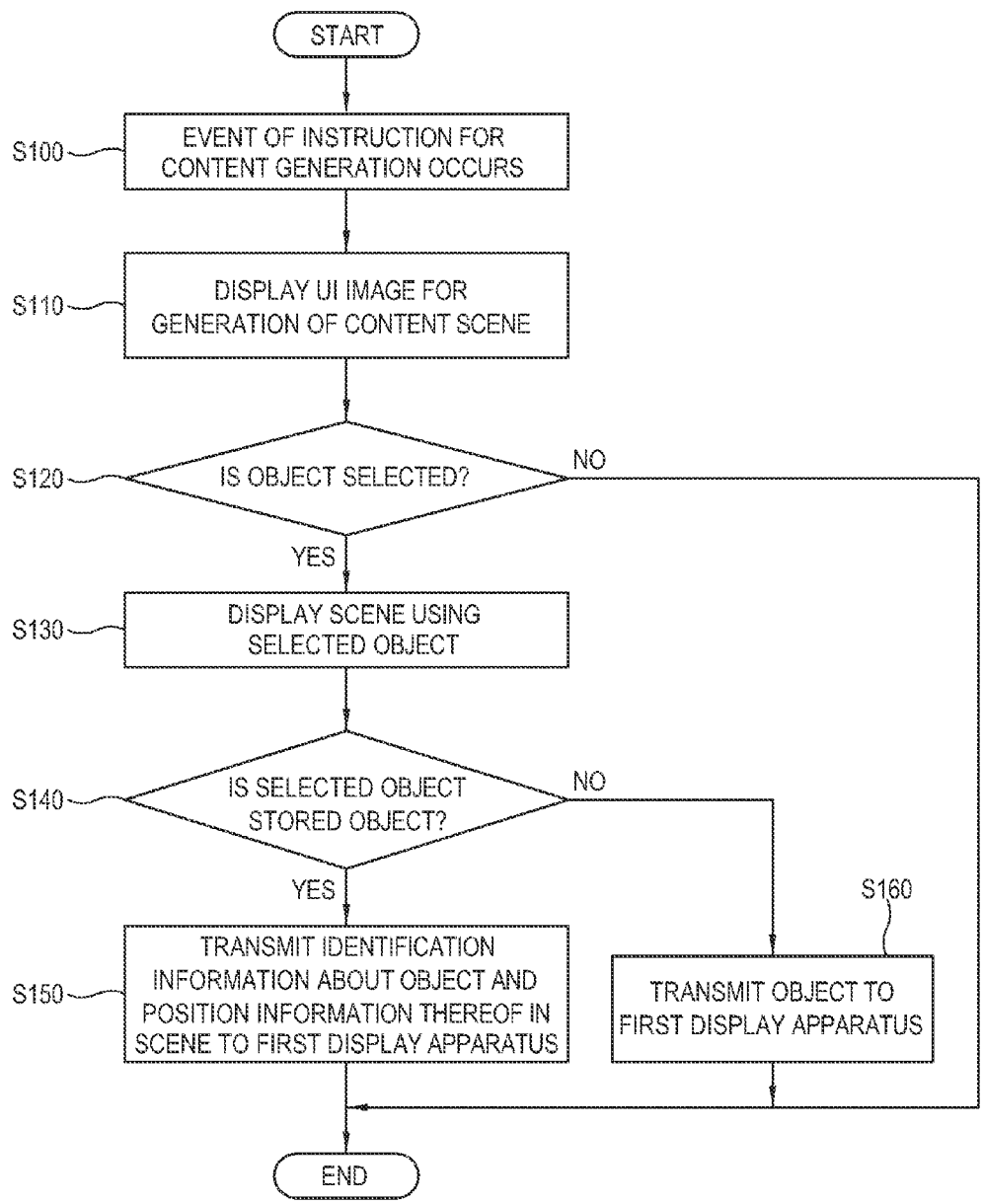
FIG. 8 is a flowchart illustrating a control method of a second display apparatus according to an embodiment of the present disclosure.

FIG. 8 is a flowchart illustrating a control method of a second display apparatus according to an embodiment of the present disclosure.

Referring to FIG. 8, when an event of an instruction for generation of the storytelling content occurs at operation S100, the second display apparatus 200 may proceed to operation S110. For example, the second display apparatus 200 may determine whether an event of an instruction for generation of the storytelling content occurs. If the second display apparatus 200 determines that an event of an instruction for generation of the storytelling content does occur, then the second display apparatus 200 may continue to poll for indication of an occurrence of such an event.

At operation S110, the second display apparatus 200 displays a UI for generation of a content scene.

At operation S120, the second display apparatus 200 determines whether an object is selected. For example, the second display apparatus 200 determines whether an object that forms the content scene is selected through the UI.

If the second display apparatus 200 determines that an object that forms the content scene is not selected through the UI at operation S120, then the second display apparatus 200 may end the control method.

If the second display apparatus 200 determines that an object that forms the content scene is selected through the UI at operation S120, then the second display apparatus proceeds to operation S130.

At operation S130, the second display apparatus 200 displays a scene using the selected object.

At operation S140, the second display apparatus 200 determines whether the selected object is the object stored in the second display apparatus 200. For example, the display apparatus 200 determines whether the selected object is the object stored in the second display apparatus 200 in advance or whether the selected object corresponds to a new object.

If the second display apparatus 200 determines that the selected object is the object stored in advance at operation S140, then the second display apparatus 200 proceeds to operation S150 at which the second display apparatus 200 transmits identification information about the called object and position information thereof in the scene to the first display apparatus 100. For example, because the same object is also stored in the first display apparatus 100, the second display apparatus 200 transmits identification information about the called object and position information thereof in the scene to the first display apparatus 100. Thus, the first display apparatus 100 may display the same image as the image of the scene on the basis of the identification information and the position information in the scene.

If the second display apparatus 200 determines that the object is not stored in advance (e.g., that the object corresponds to a new object), then the second display apparatus 200 proceeds to operation S160 at which the second display apparatus 200 transmits the object to the first display apparatus 100. For example, because the same object is not stored in the first display apparatus 100, the second display apparatus 200 transmits the object to the first display apparatus 100. Thus, the first display apparatus 100 may add the object to the image for display.

The above-described embodiment is not limiting, and may be thus modified to various forms. Hereinafter, such modified various embodiments of the present disclosure will be described.

Figure 9:
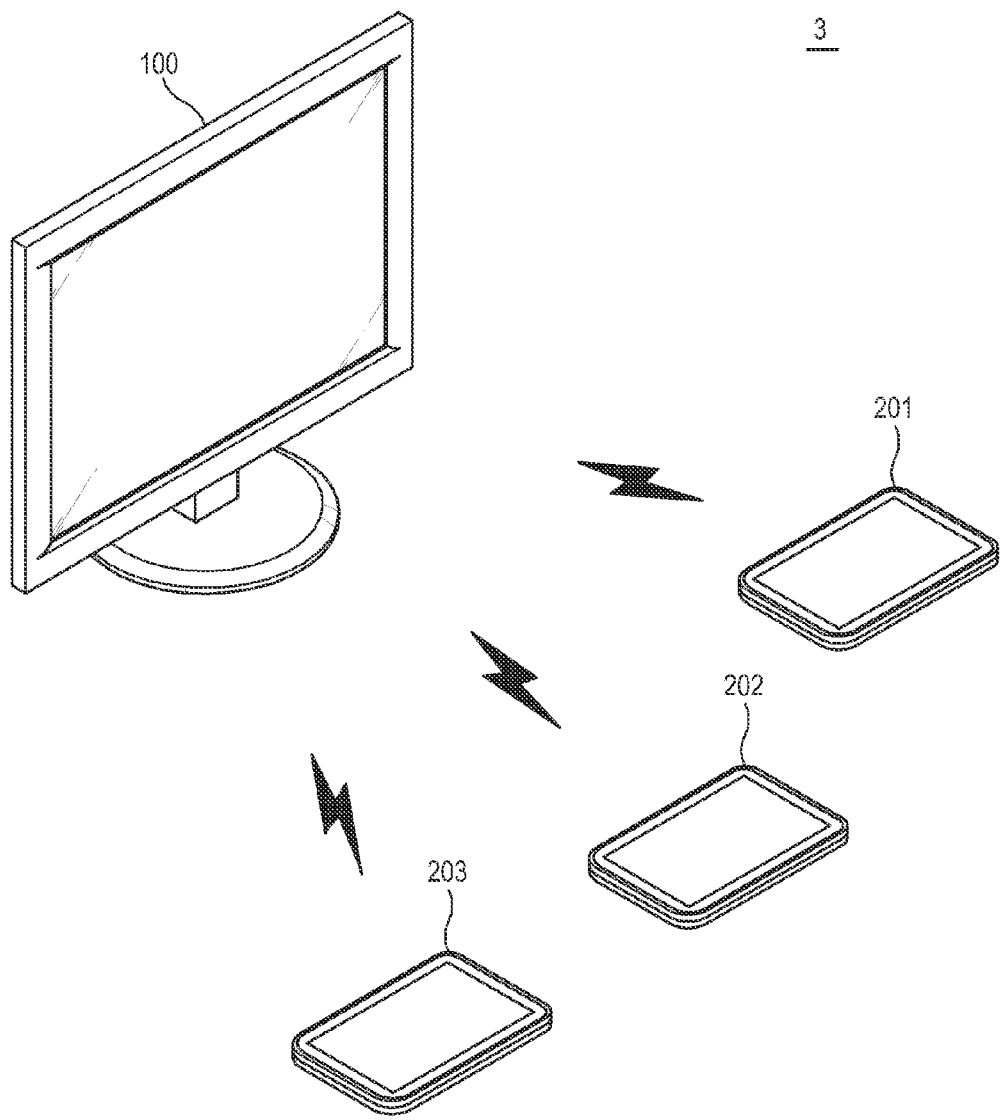
FIG. 9 illustrates an example of a system according to a second embodiment of the present disclosure.
Figure 10:
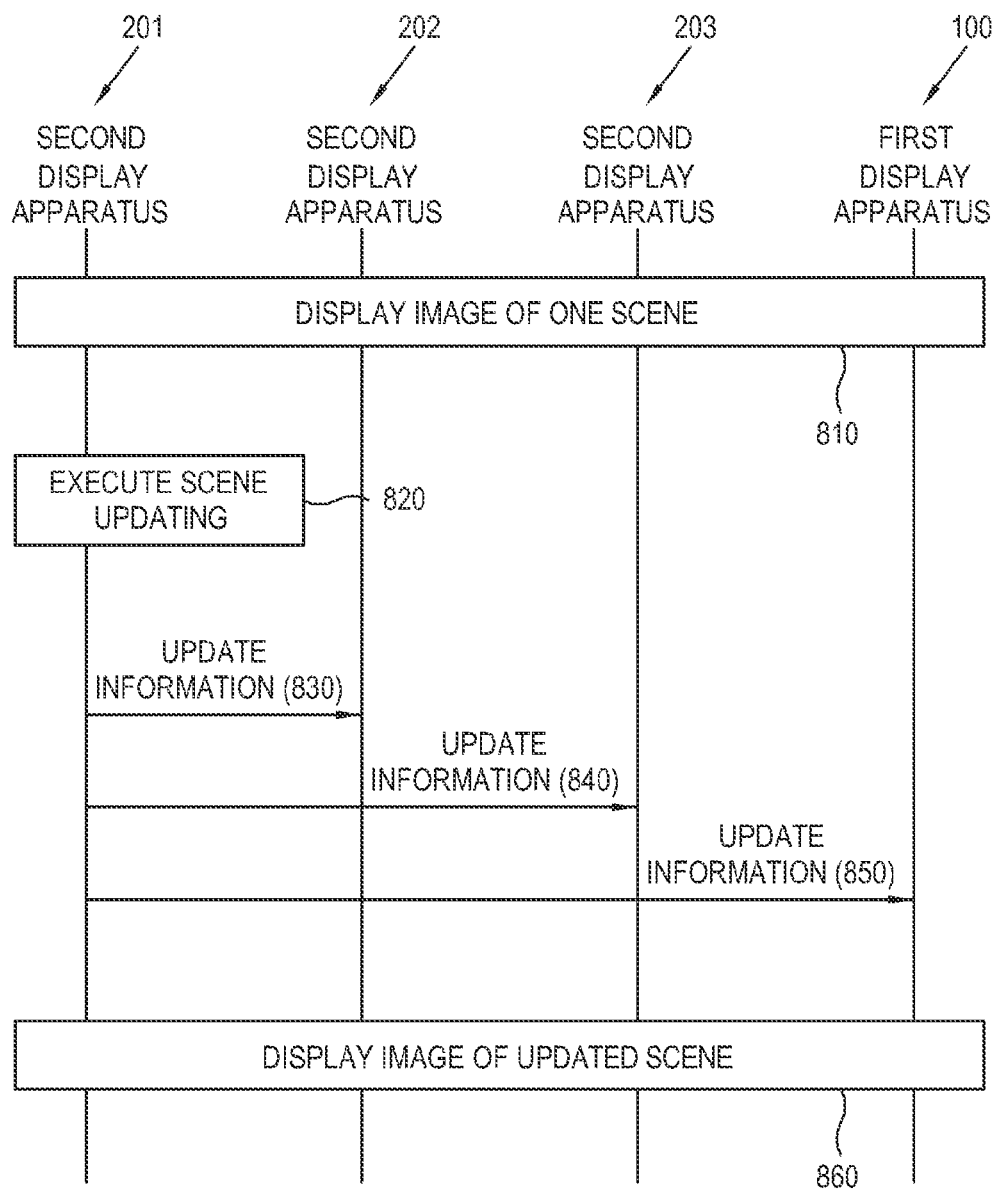
FIG. 10 illustrates an example of an information transmission relationship between a first display apparatus and a second display apparatus according to an embodiment of the present disclosure.

FIG. 9 illustrates an example of a system according to a second embodiment of the present disclosure. FIG. 10 illustrates an example of an information transmission relationship between a first display apparatus and a second display apparatus according to an embodiment of the present disclosure. For example, FIG. 10 illustrates an example of an information transmission relationship between a first display apparatus and a plurality of second display apparatuses.

According to the above-described first embodiment of the present disclosure, the system 1 includes one first display apparatus 100 and one second display apparatus 200. According to such a system 1, the scene formed in the second display apparatus 200 is displayed in the first display apparatus 100 as the image.

Referring to FIG. 9, according to various embodiments of the present disclosure, the system 3 includes a plurality of second display apparatuses 201, 202 and 203 that may be connected to one first display apparatus 100 for communication.

According to various embodiments of the present disclosure, the plurality of second display apparatuses 201, 202 and 203 may be display apparatuses of the same type or model, or may be display apparatuses of different types or models. Further, the plurality of second display apparatuses 201, 202 and 203 is connected to each other for communication.

In this environment, the respective second display apparatuses 201, 202 and 203 may form a scene of storytelling content in cooperation.

Referring to FIG. 10, when generating one scene of the storytelling content in this environment, at operation 810, the same scene is displayed in the plurality of second display apparatuses 201, 202 and 203 to be generable or updatable therein, and the same image as the scene is displayed in the first display apparatus 100.

At operation 820, if any one of the plurality of second display apparatuses 201, 202, and 203 (e.g., the second display apparatus 201) updates the scene by performing addition, deletion, or revision of the object with respect to the scene displayed therein, then, at operations 830, 840, and 850, the second display apparatus that updated the scene (e.g., the second display apparatus 201) respectively transmits update information to the first display apparatus 100 and the other second display apparatuses 202 and 203.

At operation 860, the first display apparatus 100 and the other second display apparatuses (e.g., second display apparatuses 202 and 203) update the scene for formation according to the update information received from the second display apparatus that updated the scene (e.g., the second display apparatus 201).

For example, in the above-described first embodiment of the present disclosure, the second display apparatus 200 transmits the update information to the first display apparatus 100. However, according to the present embodiment of the present disclosure, because the plurality of second display apparatuses 201, 202 and 203 generates one scene of the storytelling content in cooperation, the update information about the scene generated in one second display apparatus 201 is transmitted to the other second display apparatuses 202 and 203 in addition to the first display apparatus 100.

Accordingly, if one second display apparatus 201 updates the scene, the updated content is also reflected in the other second display apparatuses 202 and 203, so that the plurality of second display apparatuses 201, 202 and 203 can generate one scene in cooperation.

Further, because the same image as the generated scene is displayed in the first display apparatus 100, users who respectively use the plurality of second display apparatuses 201, 202 and 203 may easily confirm the scene generation process.

The method of forming the scene of the storytelling content by cooperation of the plurality of second display apparatuses 201, 202 and 203 is not limited to the above-described various embodiments of the present disclosure.

For example, according to various embodiments of the present disclosure, the plurality of second display apparatuses 201, 202 and 203 may respectively generate different scenes. In this case, an image displayed in the first display apparatus 100 may be the same as the scene generated in any one of the plurality of second display apparatuses 201, 202 and 203. Alternatively, the display screen of the first display apparatus 100 may be divided into a plurality of screens, and each scene generated in the plurality of second display apparatuses 201, 202 and 203 may be displayed in each divided screen.

The scenes generated in the plurality of second display apparatuses 201, 202 and 203 may be called when the storytelling content is finally generated. For example, if "scene formation" of the additional option menu 430 (see FIG. 4) is selected in one second display apparatus 201, the second display apparatus 201 may request the other second display apparatuses 202 and 203 to transmit data on the scenes generated therein.

Alternatively, the entire data on the scenes generated in the plurality of second display apparatuses 201, 202 and 203 may be stored in the first display apparatus 100. In this case, if "scene formation" is selected in the second display apparatus 201, the second display apparatus 201 may receive the data on the stored scenes from the first display apparatus 100 to generate the storytelling content.

Figure 11:
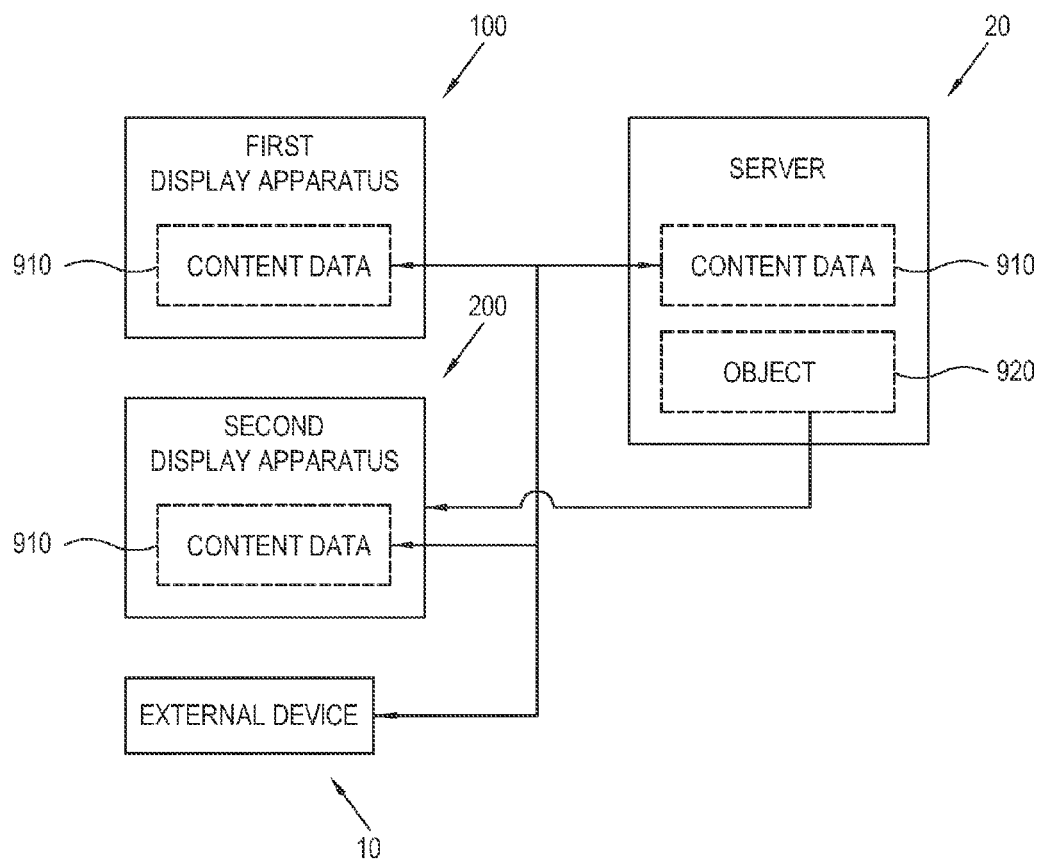
FIG. 11 is a block diagram illustrating a configuration of a system according to a third embodiment of the present disclosure.

FIG. 11 is a block diagram illustrating a configuration of a system according to a third embodiment of the present disclosure.

Referring to FIG. 11, the first display apparatus 100 and the second display apparatus 200 may be connected to an external device 10 and a server 20 for communication through a local communication line or a network. The external device 10 may be an external storage device connected to the first display apparatus 100 or the second display apparatus 200, or may be various electronic devices connected to the first display apparatus 100 or the second display apparatus 200 in a wired or wireless manner.

A content data 910 on the storytelling content generated under the control of the second display apparatus 200 according to the above-described various embodiments of the present disclosure is temporarily stored in the first display apparatus 100 or the second display apparatus 200. The content data 910 includes data on one or more scenes that form the content.

For example, if the content data 910 is temporarily stored in the first display apparatus 100 in the content generation process, the content data 910 may be finally stored in the first display apparatus 100 according to temporarily stored state, or may be transmitted to be stored in the second display apparatus 200, the external device 10 or the server 20, according to selection of the user, after completion of the content generation.

Further, if the content data 910 is temporarily stored in the second display apparatus 200 in the content generation process, the content data 910 may be finally stored in the second display apparatus 200 according to temporarily stored state, or may be transmitted to be stored in the first display apparatus 100, the external device 10 or the server 20, after completion of the content generation.

If the content data 910 is stored in the first display apparatus 100, the user may select the corresponding content through a content list provided from the first display apparatus 100 for reproduction.

According to various embodiments of the present disclosure, if the content data 910 is stored in the server 20, the user may access the server 20 through the first display apparatus 100 or the second display apparatus 200, and may select the corresponding content through a content list provided from the server 20.

Further, while the scene of the storytelling content is being generated in the second display apparatus 200 by the user, the second display apparatus 200 may receive a new object 920 which is not stored in the second display apparatus 200 from the server 20 to form the scene. The object 920 provided from the server 20 may be added to the scene through the additional option menu 430 such as, for example, the additional option menu 430 illustrated in FIG. 4.

As described above with reference to FIG. 4, the additional option menu 430 may provide various options such as "sound recording", "text input", "image", "scene formation," or the like.

Figure 12:
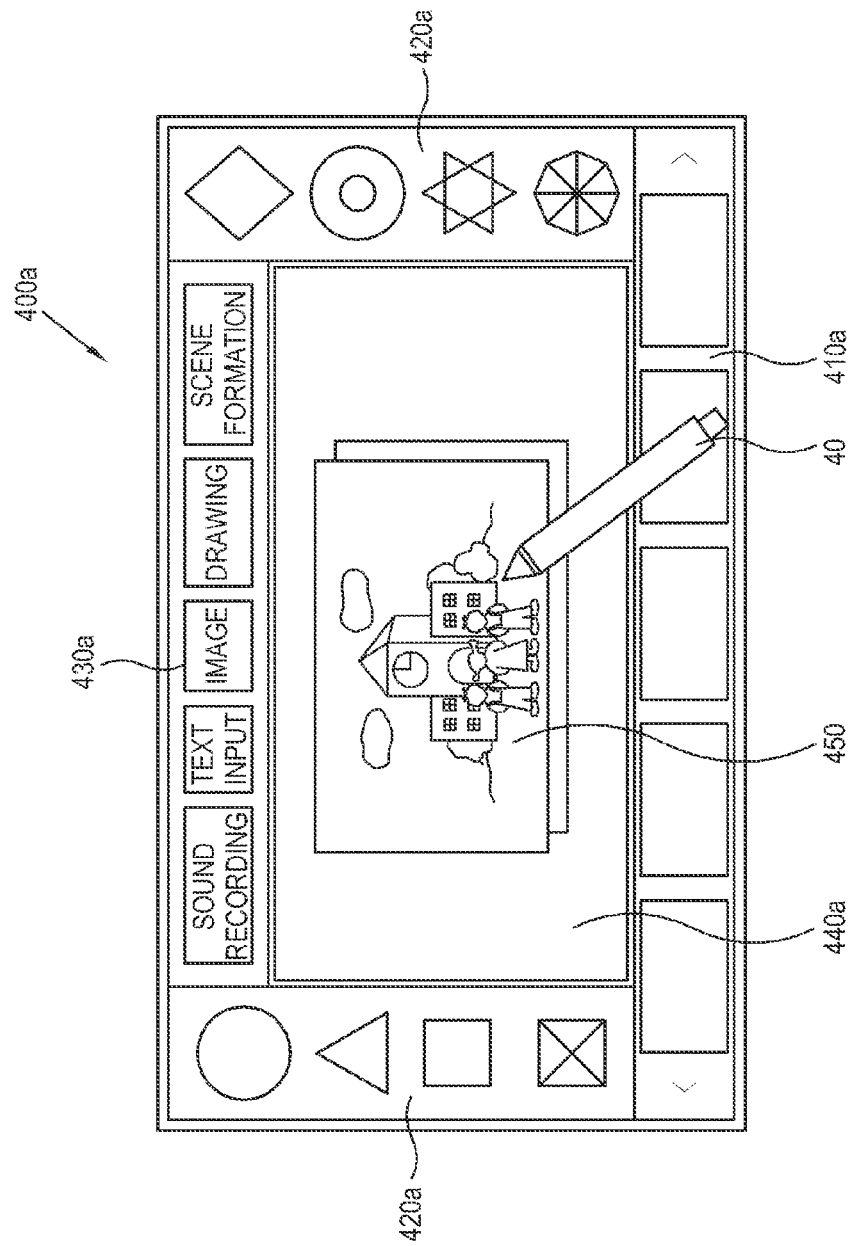
FIG. 12 illustrates an example of options provided by an additional option menu of a UI according to a fourth embodiment of the present disclosure.

FIG. 12 illustrates an example of options provided by an additional option menu of a UI according to a fourth embodiment of the present disclosure.

Referring to FIG. 12, the UI 400a includes a background image menu 410a, an inserted image menu 420a, an additional option menu 430a, and a scene formation area 440a. The background image menu 410a, the inserted image menu 420a and the scene formation menu 440a are similar to the corresponding menus illustrated in FIG. 4, and detailed description thereof will be omitted. In the additional option menu 430a, "sound recording", "text input", "image" and "scene formation" are also the same as in FIG. 4, and only a different point will be described herein.

According to various embodiments of the present disclosure, if the user selects "drawing" in the additional option menu 430a, the second display apparatus 200 displays a menu window 450 provided in association with a drawing option. The menu window 450 may be displayed in place of the scene formation area 440a, or may be displayed to be overlaid on the scene formation area 440a.

The user may draw a desired image on the menu window 450 using a finger, a stylus pen 40, or the like. Further, the user may call an image stored in the second display apparatus 200 or a different device onto the menu window 450, and may draw a new image on the called image using the finger, the stylus pen 40 or the like.

The user may add the new image generated through the menu window 450 onto the scene formation area 440a to generate the scene. During this process, the same image as the image drawn on the menu window 450 by the user may be displayed in the first display apparatus 100 in real time.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
a display section;
a transceiver configured to communicate with a first external display apparatus and a second external display apparatus;
memory configured to store a plurality of objects; and
at least one processor configured to:
display a user interface for selection and combination of the plurality of objects stored in the memory according to a command of a user to generate a scene of a storytelling content, and
transmit identification information and position information of the selected objects and combined objects of the plurality of objects stored in the memory relating to the scene to the first external display apparatus through the transceiver so that a same image as the scene is generated and displayed by the first external display apparatus in real time while the scene is being generated through the user interface,
wherein the plurality of objects comprise sound information, text, images, and drawings, wherein the scene includes at least one of the plurality of objects, wherein the storytelling content comprises a plurality of the scenes to be played sequentially, wherein the user interface includes an option for adding at least one of the plurality of objects to the scene and an option for combining the plurality of the scenes in a temporal order to generate the storytelling content, wherein the user interface comprises:
  a first menu in which the plurality of objects stored in the memory are displayed to be selectable,
  a second menu which provides an option for addition of an object which is not stored in the memory, and
  a scene formation area in which the scene formed by the object selected or newly added through the first menu or the second menu is displayed, wherein the image displayed in the first external display apparatus is the same as the scene in the scene formation area, and wherein the object which is selectable through the first menu comprises:
  a background object which is a background image of the scene, and
  an inserted image object which is an image overlaid on the background object.

2. The display apparatus according to claim 1,
wherein the first external display apparatus is further configured to store the same data as the plurality of objects stored in the memory.

3. The display apparatus according to claim 1,
wherein if the object included in the scene is not stored in the memory, the at least one processor is further configured to transmit the object to the first external display apparatus so that the first external display apparatus adds the object to the image.

4. The display apparatus according to claim 1,
wherein a size of the image displayed in the first external display apparatus is larger than a size of the scene displayed in the display section.

5. The display apparatus according to claim 4,
wherein the display apparatus comprises a mobile device.

6. The display apparatus according to claim 1,
wherein the option provided by the second menu comprises at least one of an option for adding sound information, a text, or an image input or newly added by the user to the scene, an option for combining the plurality of scenes in a temporal order to generate the content, and an option for providing an image to be added to the scene for drawing of the user.

7. The display apparatus according to claim 1,
wherein the at least one processor is further configured to:
  store the generated content in the memory, and
  transmit the content to the first external display apparatus to be stored in the first external display apparatus.

8. The display apparatus according to claim 1,
wherein the at least one processor is further configured to transmit the generated content to the second external display device to be stored in the second external display device.

9. A control method of a display apparatus, the control method comprising:
  communicating with a first external display apparatus and a second external display apparatus;
  displaying, on the display apparatus, a user interface provided to generate a scene of storytelling content;
  selecting and combining a plurality of objects which are stored in the display apparatus in advance through the user interface according to a command of a user to generate the scene; and
  transmitting identification information and position information of the selected objects and combined objects of the plurality of objects stored in the display apparatus relating to the scene to the first external display apparatus so that a same image as the scene is generated and displayed by the first external display apparatus in real time while the scene is being generated at the display apparatus, wherein the plurality of objects comprise sound information, text, images, or drawings, wherein the scene includes at least one of the plurality of objects, wherein the storytelling content comprises a plurality of the scenes to be played sequentially, wherein the user interface includes an option for adding at least one of the plurality of objects to the scene and an option for combining the plurality of scenes in a temporal order to generate the storytelling content, wherein the user interface comprises:
  a first menu in which the plurality of objects stored in the memory are displayed to be selectable,
  a second menu which provides an option for addition of an object which is not stored in the memory, and
  a scene formation area in which the scene formed by the object selected or newly added through the first menu or the second menu is displayed, wherein the image displayed in the first external display apparatus is the same as the scene in the scene formation area, and wherein the object which is selectable through the first menu comprises:
  a background object which is a background image of the scene, and
  an inserted image object which is an image overlaid on the background object.

10. The method according to claim 9,
wherein the first external display apparatus stores a same data as the plurality of objects stored in the memory.

11. The method according to claim 9,
wherein the transmission of the information relating to the scene to the first external display apparatus comprises, if the object included in the scene is not stored in the memory, transmitting the object to the first external display apparatus so that the first external display apparatus adds the object to the image.

12. The method according to claim 9,
wherein a size of the image displayed in the first external display apparatus is larger than a size of the scene displayed in the display section.

13. The method according to claim 12,
wherein the display apparatus comprises a mobile device.

14. The method according to claim 9,
wherein the option provided by the second menu comprises at least one of an option for adding sound information, a text or an image input or newly added by the user to the scene, an option for combining the plurality of scenes in a temporal order to generate the content, and an option for providing an image to be added to the scene for drawing of the user.

15. The method according to claim 9, further comprising:
storing the generated content in the memory, or transmitting the content to the first external display apparatus to be stored in the first external display apparatus.

16. The method according to claim 9, further comprising:
transmitting the generated content to the second external display device to be stored in the second external display device.

17. A system comprising:
at least two display apparatuses; and
an external display apparatus configured to communicate with the at least two display apparatuses,
wherein each of the at least two display apparatuses comprises:
    a display section;
    memory configured to store a plurality of objects; and
    at least one processor configured to:
        display a user interface for selection and combination of the plurality of objects stored in the memory according to a command of a user to generate a scene of storytelling content, and
        transmit identification information and position information of the selected objects and combined objects of the plurality of objects stored in the memory relating to the scene to the external display apparatus so that a same image as the scene is generated and displayed in the external display apparatus in real time while the scene is being generated through the user interface,
wherein the plurality of objects comprise sound information, text, images, or drawings,
wherein the scene includes at least one of the plurality of objects,
wherein the storytelling content comprises a plurality of the scenes to be played sequentially,
wherein the user interface includes an option for adding at least one of the plurality of objects to the scene and an option for combining the plurality of scenes in a temporal order to generate the storytelling content,
wherein the user interface comprises:
    a first menu in which the plurality of objects stored in the memory are displayed to be selectable,
    a second menu which provides an option for addition of an object which is not stored in the memory, and
    a scene formation area in which the scene formed by the object selected or newly added through the first menu or the second menu is displayed,
wherein the image displayed in the first external display apparatus is the same as the scene in the scene formation area, and
wherein the object which is selectable through the first menu comprises:
    a background object which is a background image of the scene, and an inserted image object which is an image overlaid on the background object.

18. The system according to claim 17,
wherein each of the at least two display apparatuses is configured to transmit information relating to the scene to each other in real time to generate the scene in cooperation, and
wherein the external display apparatus displays a same image as the scene generated by the at least two display apparatuses in real time.

19. The system according to claim 17,
wherein each of the at least two display apparatuses is configured to generate each of the plurality of scenes which forms the content, and
wherein the external display apparatus is further configured to:
    display the same image as the scene generated by any one of the at least two display apparatuses, and
    display together the same images as the plurality of scenes respectively generated by the at least two display apparatuses.

* * * * *